United States Patent [19]

Heijnen

[11] Patent Number: 4,958,856
[45] Date of Patent: Sep. 25, 1990

[54] PRESSURE ENERGIZED SEALING JOINT

[75] Inventor: Wilhelmus H. P. M. Heijnen, TA Assen, Netherlands

[73] Assignee: Shell Internationale Research Maatschappij B.V., The Hague, Netherlands

[21] Appl. No.: 333,927

[22] Filed: Feb. 2, 1989

[30] Foreign Application Priority Data

Feb. 2, 1988 [GB] United Kingdom ............... 8802238

[51] Int. Cl.$^5$ .............................................. F16L 55/00
[52] U.S. Cl. ....................................... 285/14; 285/39;
285/119; 285/332; 285/334.2; 285/354;
285/917
[58] Field of Search .................... 285/332, 917, 14, 39,
285/119, 334.2, 354

[56] References Cited

U.S. PATENT DOCUMENTS

| | | | |
|---|---|---|---|
| 872,001 | 11/1907 | Massie | 285/332 X |
| 2,366,010 | 12/1944 | Dies | 285/332 |
| 4,650,227 | 3/1987 | Babuder | 285/917 X |

FOREIGN PATENT DOCUMENTS 397603  8/1933  United Kingdom ............... 285/917

Primary Examiner—Dave W. Arola
Attorney, Agent, or Firm—Jones, Tullar & Cooper

[57] ABSTRACT

A sealing joint for use in a conduit system where an elevated pressure may exist at one side of the system comprises a pair of co-axial tubular metal sections with intermesting tapered edges which are clamped against each other by fastening means, such as a swivel nut, so as to establish a fluid tight seal formed by the conical contact area between the tapered surfaces of said edges.

One of the tubular sections has a tapered edge which is at one side thereof exposed to the elevated pressure. This section has a smaller wall thickness than the tapered edge of the other tubular section so as to allow the elevated pressure to press said tapered edges onto each other.

10 Claims, 2 Drawing Sheets

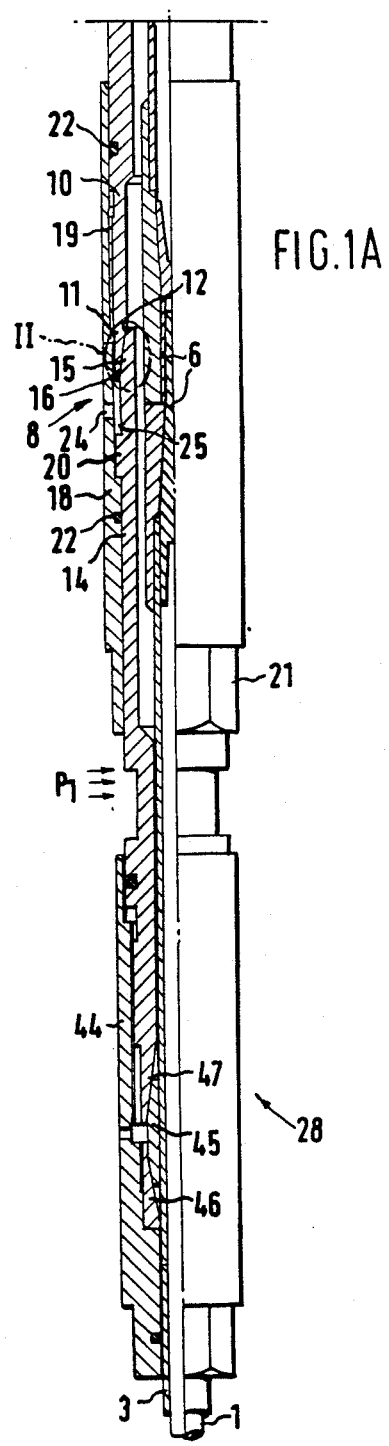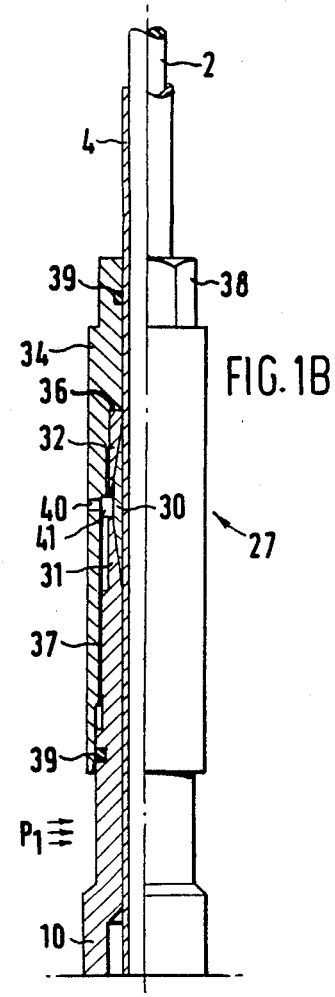

PRESSURE ENERGIZED SEALING JOINT

BACKGROUND OF THE INVENTION

The invention relates to a sealing joint for use in a conduit system where an elevated fluid pressure may exist at either the interior or exterior side of the system. More particularly it relates to a sealing joint comprising a pair of co-axial tubular metal sections with intermeshing tapered edges which are clamped against each other by mechanical fastening means.

Sealing joints of this type are usually indicated as tapered pressure fittings and the mechanical fastening means thereof commonly consist of a swivel nut which exerts a permanent axial compression force to the metal sections thereby forcing the tapered edges in a fluid tight engagement with each other. A disadvantage of the known sealing joints is that if a high pressure difference is to be withstood by the joint a proportionally high axial compression force must be exerted to the tubular sections. Due to the high compression force the sealing joint must be built of components which have sufficient strength to withstand the high compression force in addition to forces resulting from the high fluid pressure difference. As a consequence of the high compression force a continuous elastic or even plastic deformation of the tubular sections takes place in the region of the tapered edges thereof which makes it usually difficult to release the tapered edges from each other during maintenance or repair operations.

SUMMARY OF THE INVENTION

The present invention aims to obviate the disadvantages adhered to the known sealing joints and to provide an improved sealing joint which requires only a moderate axial compression force even in case the sealing joint must withstand a high pressure difference.

The sealing joint according to the invention comprises:

- a pair of co-axial tubular metal sections with intermeshing tapered edges which are clamped against each other by mechanical fastening means, thereby establishing a conical contact area between the tapered surfaces of said edges,
- a first of the tubular sections having a tapered edge which is during operation of the device at one side thereof exposed to the elevated pressure and which has at a mid point of the conical contact area a wall thickness ($t_{mf}$) which is smaller than the wall thickness ($t_{mm}$) of the adjacent tapered edge of a second tubular section at the mid point.

The sealing joint according to the invention may find application in oil and gas wells or in other hostile environments that require electrical cables to be protected by a continuous metal sheathing. The sealing joint according to the invention is very suitable for joining in oil and gas wells the metal sheating of such cables at locations where electrical connectors are present. As in such oil and gas wells an elevated fluid pressure exists outside the metal sheathed electrical conduit system the sealing joints used to interconnect the metal sheathing sections comprise each a first tubular section formed by a box section having a tapered inner surface and a second tubular section formed by a pin section having a tapered outer surface. As the first section has at the mid point of cone contact between the tapered surfaced a smaller wall thickness than the second section of the joint the elevated pressure in the well around the joint is able to press the first, thin, section onto the second, thick, section. As the rigidity of the second section is, because of its larger wall thickness, larger than that of the first section the elevated pressure around the joint activates and increases the tightness of the seal. In other words, the larger wall thickness of the second section ensures that, if the seal is deformed by fluid pressure exerted to the tapered edge of the first, thin, section, more elastic energy is stored in the second section than in the first section.

It is preferred to limit the axial preload between the two tapered metal sections below a maximum value so as to ensure that the pre-load does not deform the sections such that the tapered edges would loose contact with each other or would deform plastically.

BRIEF DESCRIPTION OF THE DRAWINGS

The invention will now be explained in more detail with reference to the accompanying drawings, in which:

FIGS. 1a and 1b show schematically adjoining sections of a conduit system comprising a pressure energized sealing joint according to the invention; the right side of the conduit system being shown as a side view and the left side being shown as a longitudinal sectional view, and FIG. 2 shows to a larger scale the encircled detail II of the sealing joint of FIG. 1a.

DETAILED DESCRIPTION

Figure 2:
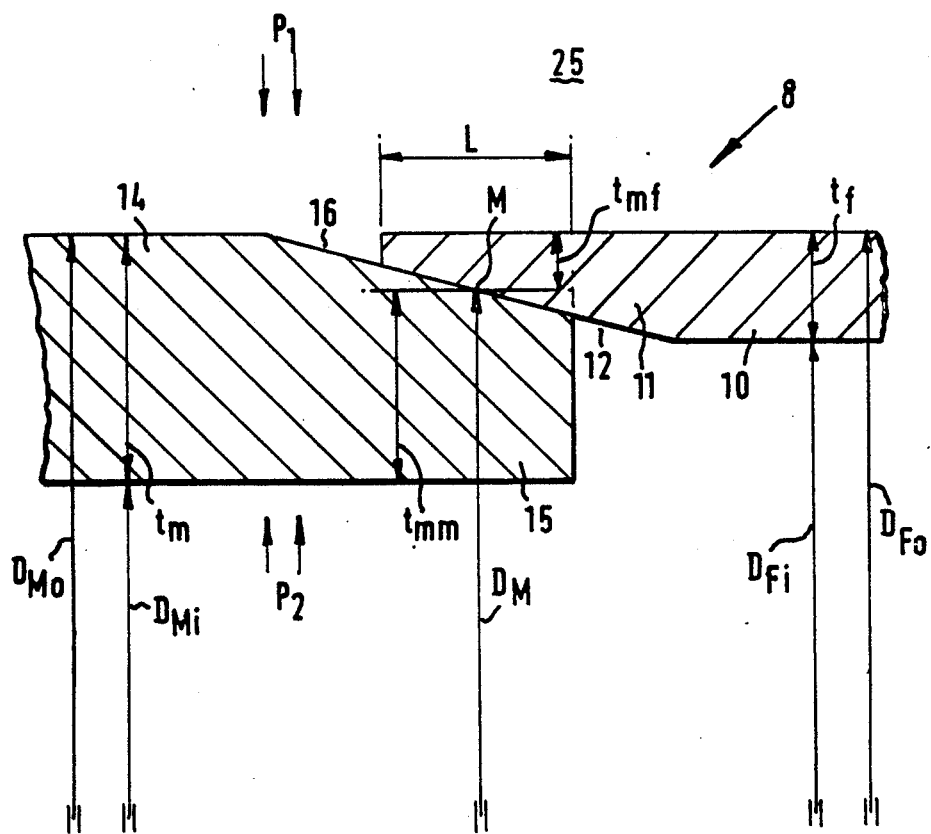

In FIGS. 1a and 1b two sections 1 and 2 of an electrical cable system are shown. Each cable section 1, 2 is protected by a metal conduit 3, 4, respectively, which conduit forms a protective sheath against fluid ingress and external impact forces. The cable sections 1, 2 are interconnected by an electric pin-box connector 6 which is surrounded by a pressure energized sealing joint 8 according to the invention.

The joint 8 comprises a first tubular metal section 10 having a tapered edge 11 with a tapered inner surface 12 and a second tubular metal section 14 having a tapered edge 15 with a tapered outer surface 16.

As will be explained with reference to FIG. 2 the tapered edge 11 of the first section 10 has at the midpoint M of the conical contact area between the tapered surfaces 12 and 16 a wall thickness $t_{mf}$ which is smaller than the wall thickness $t_{mm}$ of the tapered edge 15 of the second section 14 at the midpoint M so as to allow in use the elevated pressure $p_1$ of the fluid around the joint to press the surfaces 12 and 16 onto each other. FIG. 1a shows how the tapered surfaces 12 and 16 of the first and second section 10, 14 of the joint 8 are clamped onto each other by mechanical fastening means consisting of a swivel nut 18 which cooperates with a screw thread 19 on the first section 10 and with a shoulder 20 on the second section 14. The swivel nut 18 comprises a hexagonal portion 21 which can be gripped by a torque wrench (not shown), and elastomeric rings 22 are provided between the inner surface of the nut 18 and the outer surface of each tubular section 10, 14 to create low friction between the surfaces when the nut 18 is tightened or released by the torque wrench.

The swivel nut 18 further comprises a radial port 24 which ensures that the fluid pressure in the annular space 25 between the nut 18 and tapered edges 11 and 15 of the joint equals the fluid pressure in the space around the joint 8.

The first and second section 10, 14 of the joint 8 are each secured around a metal conduit 1, 3 by a first and second tapered pressure fitting 27, 28, respectively.

As illustrated in FIG. 1b the first pressure fitting 27 comprises a metal ring 30 having a tapered outer surface which is clamped between tapered inner surfaces of an end sleeve 31 of the first section 10 and of a metal locking sleeve 32. The sleeves 31, 32 and ring 30 are clamped in a fixed orientation against each other by a swivel nut 34 which cooperates with an end face 36 of the locking sleeve 31 and with a screw thread 37 on the first section 10. The swivel nut 34 comprises a hexagonal portion 38 which can be gripped by a torque wrench (not shown), and elastomeric rings 39 are provided between the inner surface of the nut 34 and outer surfaces of the conduit 4 and of first section 10 to create a low friction between the surfaces when the nut is tightended or released by the torque wrench.

The swivel nut 34 comprises a radial port 40 which ensures that the fluid pressure in the annular space 41 between the nut 34 and the sleeves 31 and 32 equals the fluid pressure in the space around the nut 34.

FIG. 1b further illustrates that at the midpoints of the conical contact areas between the tapered inner surfaces of the sleeves 31, 32 and the tapered outer surface of the metal ring 30 the wall thickness of said sleeves 31, 32 is smaller than that of the metal ring 30 to allow in use the elevated pressure $P_1$ of the fluid around the nut 34 to press the surfaces onto each other in the same manner as the energizing of the joint 8.

The construction of the second pressure fitting 28 is identical to that of the first pressure fitting 27 and therefore no detailed description of the construction and purpose of the swivel nut 44, metal ring 45, metal locking sleeve 46 and tubular end sleeve 47 of the second tubular section 14 and other components thereof is given in this specification.

The procedure for interconnecting the cables 1 and 2 for securing the joint around the electrical connector 6 is as follows. First the pin and box parts of the connector 6 are interconnected while the first and second tapered pressure fittings 27 and 28 are loosely arranged around the metal conduits 4 and 3 at a location away from the connector 6. Subsequently the sections 10 and 14 are slid along the conduits 3 and 4 and over the connector 6 until the tapered edges 11 and 15 are pressed onto each other. Then the swivel nut 18 is fastened by the torque wrench (not shown) so that the nut 18 exerts a predetermined axial compression force to the sections 10 and 14 of the joint 8.

Finally, the two tapered pressure fittings 27 and 28 are sealingly secured to the conduits 4 and 3 by tightening the swivel nuts 34 and 44 by the torque wrench.

A preferred procedure for selecting the axial compression force F exerted by the swivel nuts to the tapered edges of the seal according to the invention will be explained in detail with reference to FIG. 2 which shows the tapered edges Il and 15 of the encircled portion II of FIG. 1.

As in the example shown the tapered edge 11 of the first metal section 10 of the joint 8 at least partly surrounds the tapered edge 15 of the second metal section 14, the first metal section 10 will hereinafter be indicated as the box 10 and the second metal section 14 as the pin 14. Furthermore it is assumed that in use the pressure $P_1$ in the space 25 around the joint 8 is higher than the pressure $P_2$ within the joint 8. In order to allow the elevated pressure $P_1$ around the joint to press the tapered inner surface 12 of the box 10 onto the tapered outer surface 16 of the pin 14, the box 10 has at the mid point M of the conical contact area between the tapered surfaces 12 and 16 a wall thickness $t_{mf}$ which is smaller than the wall thickness $t_{mm}$ of the pin 14 of the midpoint M.

The following calculations will give boundary conditions under which the seal integrity of the sealing joint is reliable.

From page 448 of the handbook Formulas for stress and strain (fifth edition, published by Mc Graw-Hill International Book Company, authors: R. J. Roark and W. C. Young) the following equations can be derived for hoop stress and deformations in thin-walled cylindrical pressure vessels:

$$s = q \cdot R/t) \quad (1)$$

$$dR = q \cdot R^2 / Et \quad (2)$$

$$dy = v \cdot y \cdot q \cdot R / Et \quad (3)$$

where s = hoop stress
q = radial pressure exerted to cylinder wall
R = radius of cylinder
t = wall thickness of cylinder
dR = radial displacement of cylinder
dy = change in axial length of cylinder, and
y = axial length of cylinder
v = poisson's ratio
E = modulus of elasticity From page 290 of the handbook Schaums Strength of materials (second edition; published by: McGraw-Hill Book company; author: W. A. Nash) the following equation can be derived for elastic energy in the wall of a thin-walled pressure vessel:

$$U = F_r \cdot dR \quad (4)$$

where
U = elastic energy
$F_r$ = radial tension or compression force
dR = radial displacement of cylinders From equation (1) it follows that: $F_r = s \cdot R \cdot t$ (5)

Combining equations (1), (2), (4) and (5) gives:

$$U = s \cdot \pi \cdot R \cdot t \cdot qR^2/E \cdot t = (q \cdot R/t) \cdot \pi R \cdot t \cdot q \cdot R^2/Et = \pi \cdot q^2 \cdot R^4/E \cdot t \quad (6)$$

To ensure that the elevated pressure $p_1$ is able to press the box 10 onto the pin 14 the elastic energy $U_{box}$ in the box 10 must be at least equal or larger than the elastic energy $U_{pin}$ in the pin, or:

$$U_{box} = S \cdot U_{pin} \quad (7)$$

where S = safety factor $\geq 1$.

When taking the following parameters into account:

$$q_{box} = P_1, \quad R_{box} = D_{fo}/2, \quad t_{box} = t_{mf}$$
$$q_{pin} = P_2, \quad R_{pin} = D_m/2, \quad t_{pin} = t_{mm}$$

where:
Dfo = outer diameter of box
$D_m$ = outer diameter of pin at midpoint M of conical contact
$P_1$ = pressure in the space surrounding the joint
$t_{mf}$ = thickness of box at midpoint M, and $t_{mm}$ = thickness of pin at midpoint M;
the following equation can be derived from equations (6) and (7) for the elastic energy in the pin and box at the midpoint M:

$$P_1^2 \cdot D_{FO}^4 / t_{mf} = S \cdot P_c^2 \cdot D_M^4 / t_{mm} \tag{8}$$

where: $P_c$ = contact pressure at midpoint M between pin and box.

The contact pressure $P_c$ between the pin and box under an axial pre-load F can be estimated by the formula:

$$P_c = 4 \cdot F / (\pi \cdot (D^2 - d^2)) \tag{9}$$

where:
$D = D_m + L \cdot tg\alpha$
$d = D_m - L \cdot tg\alpha$
$\alpha$ = taper angle
L = axial length of cone contact between pin and box
From formula (9) the following equation can be derived:

$$P_c = F / (\pi \cdot D_M \cdot L \cdot tg) \tag{10}$$

When taking into account that for thin walled tubes the assumption can be made that $D_{FO} \approx D_M$, and that the contact pressure $P_c$ will increase with increasing external pressure $P_1$ and that therefore the condition at the lowest contact pressure $P_c$ and external pressure $P_1$ is only to be considered, the following assumptions can be made as boundary conditions:

$$D_{FO} = D_M \tag{8a}$$

$P_1 = 1$ bar (atmospheric), and minimum contact pressure $P_c$ is at pre load condition. Now the following equation can be derived from equations (8) and (10):

$$F \leq \pi \cdot D_M \cdot L \cdot tg\alpha \cdot P_1 \sqrt{t_{mm}/(t_{mf} \cdot S)} \tag{11}$$

When taking the boundary conditions into account that $P_1 = 1$ bar and that the safety factor S equals 1, the following extreme value for the axial pre-load force can be derived from equation (11):

$$F \leq \pi \cdot D_M \cdot L \cdot tg\alpha \cdot \sqrt{t_{mm}/t_{mf}} \tag{12}$$

If this condition is not fulfilled the seal will not be activated properly, owing to lack of prestress.

From equation (8) and (8a) it can be derived that:

$$P_2 \leq \sqrt{P_1^2 \cdot t_{mm}/(S \cdot t_{mf})} \tag{13}$$

or $$t_{mm}/t_{mf} \geq S \cdot (P_2/P_1)^2$$

In the extreme case S equals 1, so that the following boundary condition can be given to fulfill the requirement that the seal will not elastically open by the pressure difference between the exterior and interior of the sealing joint, owing to lack of prestress:

$$t_{mm}/t_{mf} \geq (P_2/P_1)^2 \tag{14}$$

Equation (12) provides a suitable indication of maximum magnitude of the axial pre-load which is to be exerted by the swivel nut 18 to the pin and box sections 10 and 14 of the joint 8 to ensure that the seal is activated properly. Equation (14) indicates that the ratio $t_{mm}/t_{mf}$ between the wall thickness of the pin and that of the box at the midpoint M should be substantially proportional to the ratio $P_2/P_1$ between the internal and external pressure.

It can further be derived that in order to avoid that the pressure difference $P_1 - P_2$ would cause collapse of the box section and then induce a seal failure, the following condition should be fulfilled:

$$P_1 - P_2 \leq \frac{2E}{1 - \nu^2} / (D_M/t_f) \cdot (D_M/t_f - 1) \tag{15}$$

where: E = modulus of elasticity.

In the equation (15) it is assumed pin and box section of the joint have the same modulus of elasticity. It will be understood that instead of using metals with a similar modulus of elasticity also metals with different moduli of elasticity may be used for the pin and box. In the latter case equation (15) will have to be modified in order to take this difference into account.

It is preferred to select in the sealing joint according to the invention the taper angle $\alpha$ at about 8° so as to ensure an optimum stress distribution in the pin and box section of the joint.

I claim:

1. A pressure energized sealing joint for use in a conduit system where during operation an elevated fluid pressure ($P_1$) exists at one side of the system, the joint comprising:

a pair of co-axial tubular metal sections and mechanical fastening means, said tubular metal sections having intermeshing tapered edges which are clamped against each other by said mechanical fastening means, thereby establishing a conical contact area between the tapered surfaces of said edges, a first of said tubular sections having a tapered edge which is during operation of the device at one side thereof exposed to said elevated pressure and which has at a mid point M of said conical contact area a wall thickness ($t_{mf}$) which is smaller than the wall thickness ($t_{mm}$) of the adjacent tapered edge of a second tubular section at said mid point M, the ratio between ($t_{mm}$) and ($t_{mf}$) being selected in conjunction with the ratio between the elevated pressure ($P^1$) at one side of the system and a pressure ($P_2$) at the other side of the system in accordance with the expression: $t_{mm}/t_{mf} \geq (P_2/P_1)^2$.

2. The joint of claim 1, further comprising adjusting means for inducing the mechanical fastening means to exert a selected axial pre-load F to the metal sections during assembling of the device, the maximum value of said pre-load being derived from the expression:

$$F \leq \pi \cdot D_M \cdot L \cdot tg\alpha \cdot P_1 \sqrt{t_{mm}/t_{mf}}$$

where:
F = maximum value of pre-load (N)
$D_M$ = diameter of mid-point of conical contact area between tapered edges (m)
L = axial length of conical contact area (m)

α = cone angle

Phd 1 = elevated pressure atone side of the system (N/m²)

3. The sealing joint of claim 2 wherein the cone angle of said tapered surfaces is about 8°.

4. The sealing joint of claim 1 wherein said first tubular section has a tapered edge of which the inner surface is tapered and the second tubular section has a tapered edge of which the outer surface is tapered.

5. The sealing joint of claim 4 wherein the joint forms a protective shell around a metal sheathed electrical cable system at a location where two electrical cables are removably interconnected by an electrical connector.

6. The sealing joint of claim 5 wherein the tubular metal sections are each secured around a metal sheathed electrical cable by a tapered pressure fitting, each pressure fitting comprising a metal ring which is clamped around said metal sheath by inwardly tapered surfaces of adjacent clamping sleeves and a swivel nut surrounding and interconnecting said sleeves.

7. The sealing joint of claim 6 wherein each swivel nut comprises at least one radial port for equaling the fluid pressure within the nut to the fluid pressure outside the nut.

8. The sealing joint of claim 1 wherein said mechanical fastening means consist of a swivel nut which surrounds said tapered edges and cooperates with a shoulder on one of said tubular metal sections and with a screw thread on the other of said tubular metal section.

9. The sealing joint of claim 8 wherein the adjusting means for inducing the swivel nut to exert said axial pre-load to the metal sections of the joint consists of torque wrench provided with means for measuring the torque applied to the swivel nut.

10. The sealing joint of claim 8 wherein each swivel nut comprises at least one radial port for equaling the fluid pressure within the nut to the fluid pressure outside the nut.

* * * * *